United States Patent
Kanczuzewski et al.

(10) Patent No.: US 10,611,292 B2
(45) Date of Patent: Apr. 7, 2020

(54) CARGO RESTRAINT METHOD

(71) Applicant: LOGISTICK, INC., South Bend, IN (US)

(72) Inventors: Nicholas Kanczuzewski, Mishawaka, IN (US); John E. Townsend, Paw Paw, IN (US)

(73) Assignee: LOGISTICK, INC., South Bend, IN (US)

( * ) Notice: Subject to any disclaimer, the term of this patent is extended or adjusted under 35 U.S.C. 154(b) by 0 days.

(21) Appl. No.: 15/995,544

(22) Filed: Jun. 1, 2018

(65) Prior Publication Data

US 2019/0366907 A1 Dec. 5, 2019

(51) Int. Cl.
*B60P 7/15* (2006.01)
*B60P 7/08* (2006.01)

(52) U.S. Cl.
CPC ............... *B60P 7/15* (2013.01); *B60P 7/0815* (2013.01)

(58) Field of Classification Search
CPC ................................ B60P 7/15; B60P 7/0815
See application file for complete search history.

(56) References Cited

U.S. PATENT DOCUMENTS

| | | |
|---|---|---|
| 969,002 A | 8/1910 | Teachout |
| 1,238,874 A | 9/1917 | Biela |
| 1,401,419 A | 12/1921 | Mcnally |
| 1,951,660 A | 3/1934 | Klaudt |
| 2,124,082 A | 7/1938 | Reifer |
| 2,414,160 A | 1/1947 | Moon |
| 2,464,080 A | 3/1949 | Hankins |
| 2,467,681 A | 4/1949 | McKinney |
| 2,468,101 A | 4/1949 | Nampa |
| 2,468,104 A | 4/1949 | Phillips |
| 2,697,631 A | 12/1954 | Miller |
| 2,752,864 A | 7/1956 | McDougal, Sr. et al. |
| 2,766,704 A | 10/1956 | McMahon |
| 2,845,245 A | 5/1958 | Gray et al. |
| 2,905,107 A | 9/1959 | Nichol |
| 2,912,939 A | 11/1959 | Miner, Jr. et al. |
| 2,980,037 A | 4/1961 | Elsner |
| 2,993,708 A | 7/1961 | Holman, Jr. |
| 3,075,478 A | 1/1963 | Elsner |
| 3,090,600 A | 5/1963 | Smith |
| 3,177,007 A | 4/1965 | Oren |
| 3,344,750 A | 10/1967 | Kostrewa |
| 3,367,286 A | 2/1968 | Jantzen |
| 3,559,591 A | 2/1971 | Breen et al. |
| 3,590,746 A | 7/1971 | Gibson |
| 3,712,663 A | 1/1973 | Laven |
| D232,821 S | 9/1974 | Fry |

(Continued)

FOREIGN PATENT DOCUMENTS

GB 1209255 10/1970

*Primary Examiner* — Hilary L Gutman
(74) *Attorney, Agent, or Firm* — Barnes & Thornburg LLP

(57) ABSTRACT

A method for engaging an elongate support for restraining cargo in a container having a pair of spaced walls, includes securing to one of the walls a base strip such that a longitudinal axis of the base strip extends in a vertical direction. The base strip includes sliding rails. The method also includes engaging the base strip and a sleeve defining a cavity for receiving an end of the elongate support by engaging the slide rails with a slot defined by the sleeve.

19 Claims, 13 Drawing Sheets

(56) References Cited

U.S. PATENT DOCUMENTS

| | | |
|---|---|---|
| 3,836,174 A | 9/1974 | Holman, Jr. |
| 3,995,565 A | 12/1976 | Kersey |
| 4,026,508 A | 5/1977 | Ziegler |
| 4,080,906 A | 3/1978 | Brown |
| D248,228 S | 6/1978 | Robertson |
| 4,264,251 A | 4/1981 | Blatt |
| 4,278,376 A | 7/1981 | Hunter |
| 4,396,325 A | 8/1983 | Joice-Cavanagh |
| 4,432,678 A | 2/1984 | Liebel |
| 4,473,225 A | 9/1984 | Miller |
| 4,498,824 A | 2/1985 | Kinkle |
| 4,616,757 A | 10/1986 | Hobson |
| 4,700,918 A | 10/1987 | Andrasko, Jr. |
| 4,718,584 A | 1/1988 | Schoeny |
| D294,340 S | 2/1988 | Robson |
| 4,735,468 A | 4/1988 | Taylor, Jr. et al. |
| 4,756,498 A | 7/1988 | Frye |
| 4,801,228 A | 1/1989 | Van Gompel |
| 4,830,558 A | 5/1989 | Sweeney |
| 4,846,610 A | 7/1989 | Schoenleben |
| 4,880,342 A | 11/1989 | Pradovic |
| 4,932,817 A | 6/1990 | Mattare |
| 4,955,771 A | 9/1990 | Bott |
| 4,962,907 A | 10/1990 | Gary |
| D312,604 S | 12/1990 | Barnes et al. |
| 4,982,922 A | 1/1991 | Krause |
| 5,028,184 A | 7/1991 | Krause |
| 5,037,256 A | 8/1991 | Schroeder |
| D324,303 S | 3/1992 | Miller |
| 5,156,110 A | 10/1992 | Fuller |
| 5,161,700 A | 11/1992 | Stannis et al. |
| 5,169,007 A | 12/1992 | McHendry |
| D332,242 S | 1/1993 | Graehling |
| 5,219,251 A | 6/1993 | Kanczuzewski |
| D339,682 S | 9/1993 | Phelps |
| 5,259,712 A | 11/1993 | Wayne |
| 5,281,063 A | 1/1994 | Austin, III |
| D344,482 S | 2/1994 | Arvidsson |
| D347,419 S | 5/1994 | Jackson |
| 5,320,464 A | 6/1994 | Long et al. |
| 5,326,204 A | 7/1994 | Carlson et al. |
| 5,362,184 A | 11/1994 | Hull et al. |
| 5,370,482 A | 12/1994 | Long |
| 5,392,972 A | 2/1995 | Caruso et al. |
| D358,125 S | 5/1995 | Jackson |
| 5,494,389 A | 2/1996 | Kanczuzewski |
| 5,526,972 A | 6/1996 | Frazier et al. |
| D372,016 S | 7/1996 | Wolford |
| D373,754 S | 9/1996 | Pinterpe |
| D376,578 S | 12/1996 | Redford |
| 5,636,951 A | 6/1997 | Long et al. |
| D382,533 S | 8/1997 | Okland |
| 5,688,087 A | 11/1997 | Stapleton et al. |
| D392,246 S | 3/1998 | Anderson |
| D395,998 S | 7/1998 | Ballinger |
| D397,322 S | 8/1998 | Tobin |
| 5,807,047 A | 9/1998 | Cox |
| D406,095 S | 2/1999 | Denny et al. |
| D412,151 S | 7/1999 | Ferrigan |
| D422,554 S | 4/2000 | Stapleton et al. |
| 6,068,228 A | 5/2000 | Kobayashi et al. |
| D426,512 S | 6/2000 | Ciuba |
| 6,074,143 A | 6/2000 | Langston et al. |
| 6,086,299 A | 7/2000 | Kanczuzewski |
| 6,106,205 A | 8/2000 | Haire |
| D434,369 S | 11/2000 | Matthies |
| D438,022 S | 2/2001 | Bunn |
| D450,291 S | 11/2001 | Wang |
| D453,869 S | 2/2002 | Schultz et al. |
| D458,210 S | 6/2002 | Kanczuzewski et al. |
| 6,419,434 B1 | 7/2002 | Rahn |
| 6,431,804 B1 | 8/2002 | Wetzig, III |
| D462,310 S | 9/2002 | Kanczuzewski et al. |
| 6,454,501 B1 | 9/2002 | Parker |
| 6,533,513 B2 | 3/2003 | Kanczuzewski et al. |
| 6,572,063 B1 | 6/2003 | Gitelman et al. |
| D478,857 S | 8/2003 | Petersen et al. |
| 6,607,338 B2 | 8/2003 | Lemke |
| 6,851,652 B1 | 2/2005 | Huang |
| 6,874,982 B2 | 4/2005 | Rhodes |
| D506,076 S | 6/2005 | Weisgerber |
| 6,942,004 B2 | 9/2005 | Whittemore |
| 7,037,055 B1 | 5/2006 | Rogers et al. |
| 7,134,820 B2 | 11/2006 | Ehrlich |
| D537,405 S | 2/2007 | Saward |
| 7,334,973 B2 | 2/2008 | Scott |
| 7,356,888 B2 | 4/2008 | Chao et al. |
| D571,279 S | 6/2008 | Trusty et al. |
| D589,709 S | 4/2009 | Edwards |
| 7,628,572 B2 | 12/2009 | Kanczuzewski et al. |
| 7,713,008 B2 | 5/2010 | Kanczuzewski et al. |
| 7,785,051 B2 | 8/2010 | Kanczuzewski et al. |
| 7,785,052 B2 | 8/2010 | Kanczuzewski et al. |
| 7,817,922 B2 | 10/2010 | Cho et al. |
| D633,030 S | 2/2011 | Robertson |
| D638,345 S | 5/2011 | Kanczuzewski et al. |
| 8,172,494 B1 * | 5/2012 | Knox .................... B60P 7/15 410/143 |
| 8,192,121 B1 | 6/2012 | Kanczuzewski et al. |
| 8,425,166 B2 | 4/2013 | Kanczuzewski et al. |
| 8,545,150 B2 | 10/2013 | Kanczuzewski et al. |
| 8,545,151 B2 | 10/2013 | Kanczuzewski et al. |
| 8,550,758 B2 | 10/2013 | Kanczuzewski et al. |
| 8,696,273 B1 | 4/2014 | Kanczuzewski et al. |
| D722,004 S | 2/2015 | Kanczuzewski et al. |
| 9,234,537 B2 | 1/2016 | Huang |
| D756,291 S * | 5/2016 | Masanek, Jr. ................ D12/426 |
| 9,550,446 B1 | 1/2017 | Kanczuzewski et al. |
| 9,764,679 B2 | 9/2017 | Kanczuzewski et al. |
| 9,821,701 B2 | 11/2017 | Kanczuzewski et al. |
| 2002/0071733 A1 | 6/2002 | Parker |
| 2002/0176759 A1 | 11/2002 | Kanczuzewski |
| 2004/0156692 A1 | 8/2004 | Rhodes |
| 2007/0224010 A1 | 9/2007 | Cunningham |
| 2008/0152455 A1 | 6/2008 | Kanczuzewski |
| 2010/0111636 A1 | 5/2010 | Widynowski et al. |
| 2010/0308091 A1 | 12/2010 | Hubbard |
| 2011/0068137 A1 | 3/2011 | Murray et al. |
| 2015/0158411 A1 | 6/2015 | Pakulak |
| 2019/0367266 A1 | 12/2019 | Kanczuzewski |
| 2019/0367267 A1 | 12/2019 | Kanczuzewski |

* cited by examiner

CARGO RESTRAINT METHOD

The present disclosure relates to a method for restraining cargo within a container.

BACKGROUND

Cargo transported for commercial and other uses is often shipped in semi-trailers or other trucks, railcars, ships, aircraft or other containers. In most instances, shifting or translation of cargo within the container can occur during shipping which can lead to damage. It is known to secure a pair of cargo retention devices on opposed walls of the shipping container, and an elongate support in the form of a wood beam or the like is positioned across the bed of the shipping vehicle and engaged with the cargo retention devices to secure cargo.

SUMMARY

The present disclosure relates to a method for engaging an elongate support for restraining cargo in a container having a pair of spaced walls. The method includes securing to one of the walls a base strip such that a longitudinal axis of the base strip extends in a vertical direction. The base strip includes a top surface having first engaging structure extending along the longitudinal axis. The method also includes engaging the base strip and a sleeve defining a cavity for receiving an end of the elongate support and having second engaging structure by engaging the first engaging structure and the second engaging structure.

The first engaging structure may include one or more slide rails extending along the longitudinal axis. The second engaging structure defines a slot for receiving the one or more slide rails. Engaging the base strip and a sleeve includes sliding the slide rail into the slot. A leading end of each of the one or more slide rails may be tapered and the slot may be a dovetail slot and the sliding rails are configured to be received by the dovetail slots.

The method may also including limiting the movement of the sleeve in a longitudinal direction of the longitudinal axis after slidably engaging the base strip and the sleeve with a stop disposed on the top surface adjacent other ends of the two slide rails. The one or more slide rails may extend from the stop vertically upwards along the wall. The method may further include engaging the base strip and the sleeve by slidingly receiving a pair of lips of the base strip within a pair of channels defined by the sleeve. The method may also include stabilizing the sleeve relative to the base strip by receiving a plurality of stabilizers disposed on the stop within a pair of openings defined by the sleeve.

If the wall is corrugated, the securing may also include securing the base strip selectively to either the trough of the corrugated wall or the peak of the corrugated wall.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

Figure 1:
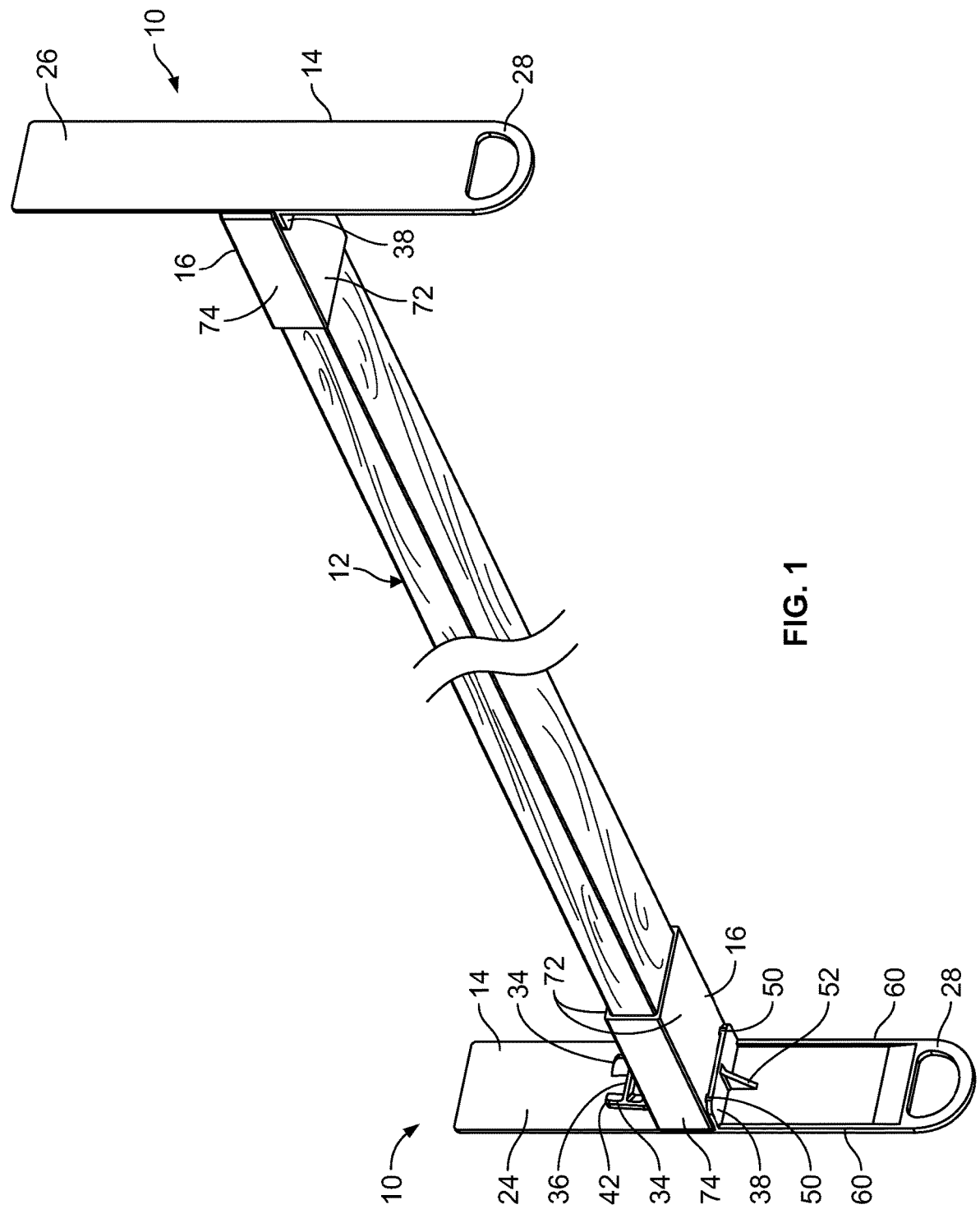
FIG. 1 is a perspective view of a pair of cargo restraint assemblies in accordance with an illustrated embodiment of the present disclosure and an elongate support for restraining cargo in a container.
Figure 2:
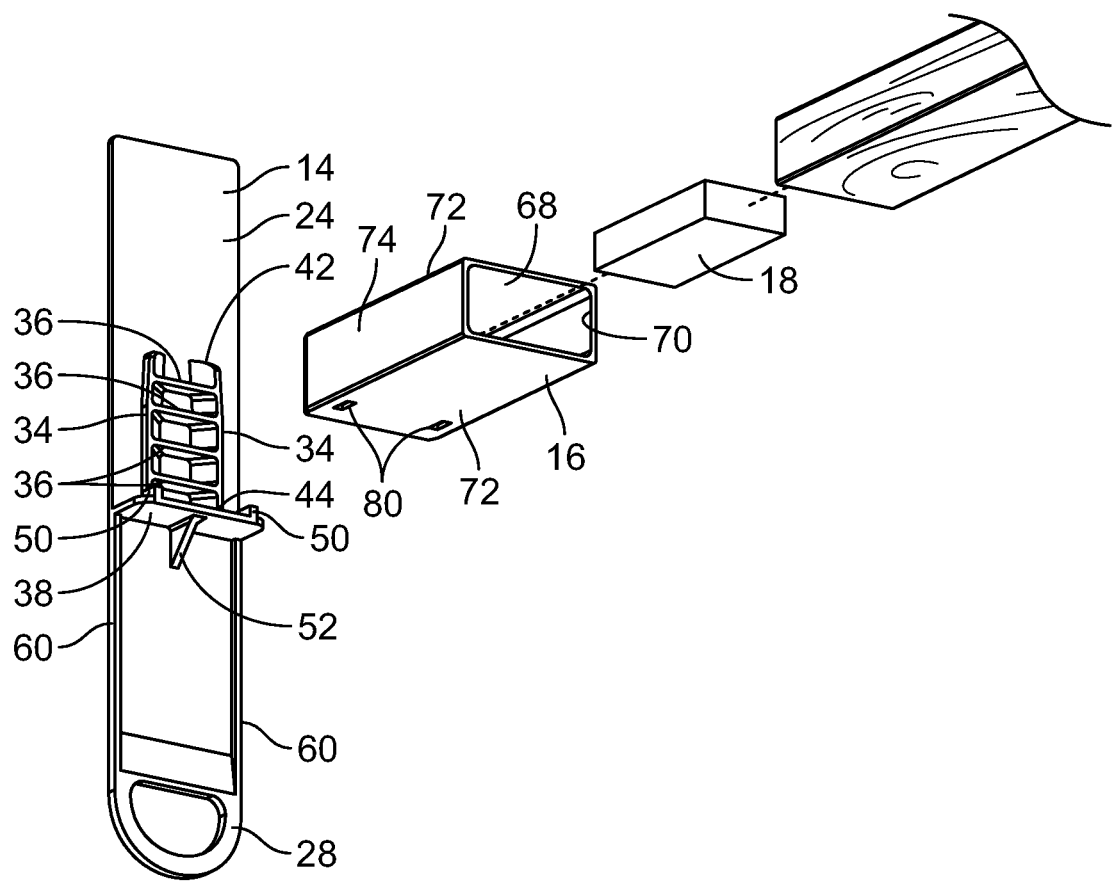
FIG. 2 is an exploded view of one of the cargo restraint assemblies and the end of the elongate support of FIG. 1.
Figure 3:
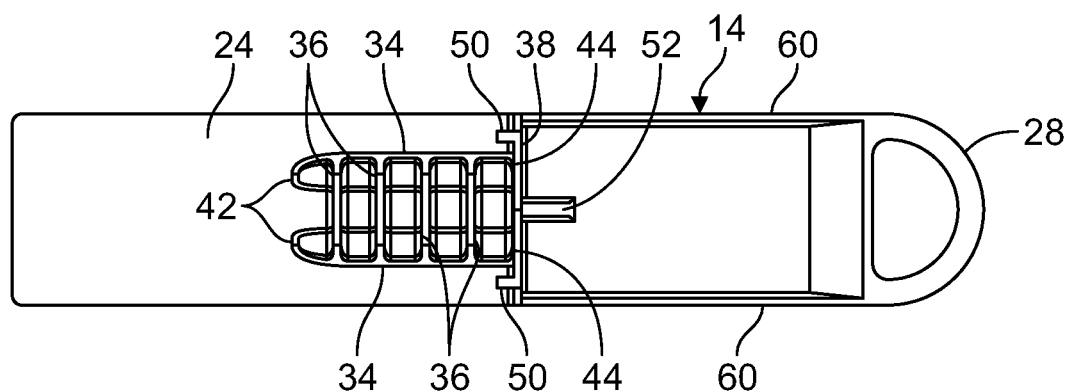
FIG. 3 is a top plan view of the base of one of the cargo restraint assemblies of FIG. 1.
Figure 4:
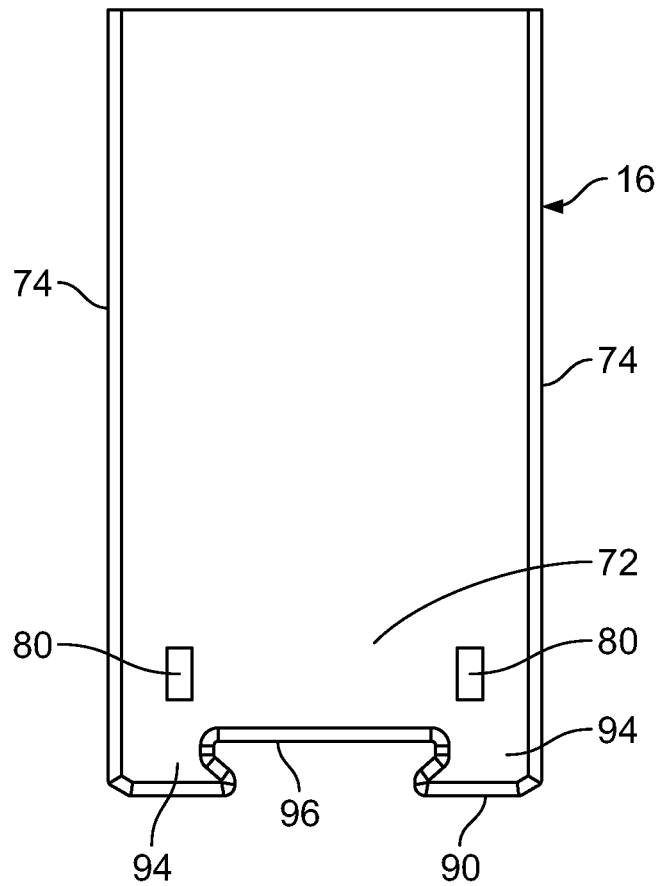
FIG. 4 is a plan view of a front or back wall of the sleeve of one of the cargo restraint assemblies of FIG. 1.
Figure 5:
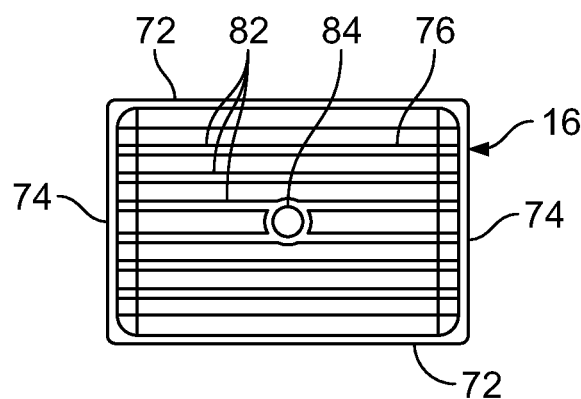
FIG. 5 is a top plan view of the sleeve of the cargo restraint assembly of FIG. 1.
Figure 6:
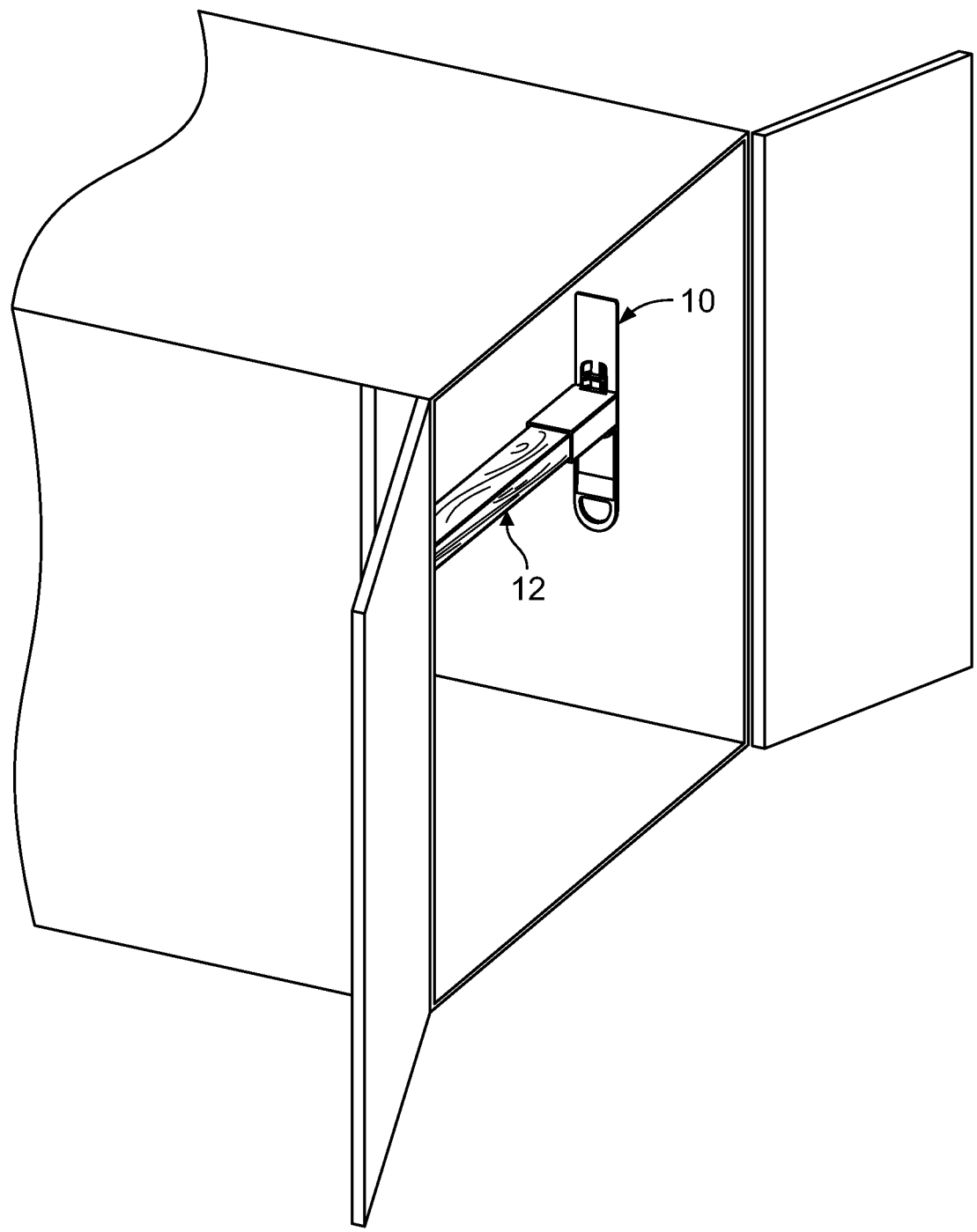
FIG. 6 is a partial view of a shipping container and the cargo restraint assemblies and elongate support of FIG. 1 for restraining cargo in a shipping container in accordance with an illustrated embodiment of the present disclosure.

FIGS. 1-7 illustrate a pair of cargo restraint assemblies 10 and a support 12 for restraining cargo in a shipping container, such as, for example, any type of trailer, truck, railcar, ship or aircraft or other shipping vessel. Each cargo restraint assembly 10 includes a base 14, a sleeve 16 slidably and removably engageable with the base 14, and a foam insert 18. The pair of cargo restraint assemblies 10 are used to secure the elongate support 12 in place in the container to restrain cargo in the container.

In the illustrated embodiment, the base 14 is a strip that includes a top surface 24, a bottom surface 26 and a handle 28. The top surface 24 includes engaging structure for engaging the sleeve, including a pair of spaced slide rails 34 extending along a longitudinal axis of the top surface 24, a plurality of strengthening ribs 36 interconnecting the pair of spaced slide rails 34, and a stop 38. Each of the slide rails 34 has a leading or front end 42 distal from the stop 38 and a back end 44 terminating at the stop 38. The slide rails 34 may be generally parallel to each other as they extend from the back end 44 toward the front end 42 and may taper near the front end 42 to provide camming effect during sliding engagement with the sleeve 16. The slide rails 34 may have any other configuration and size and, instead, may be in the form of a single slide rail or multi slide rails in accordance with other embodiments of the present disclosure. The top surface 24 and bottom surface 26 are oppositely facing.

The stop 38 may be a rectangular wall extending perpendicular to the longitudinal axis of the base 14 at the back end 44 of the slide rails 34. The stop 38 includes a pair of spaced stabilizers 50 engageable with the sleeve 16 as hereinafter described. Each stabilizer 50 is disposed at or near the top of the stop 38 and extends toward the front end 42. The stabilizers 50 extend from at or near the top of the stop 38 down a portion of the height of the stop 38 and have a rectangular cross section. The stabilizers 50 extend significantly less than the height of the stop 38. The stabilizers 50 may have any other configuration in accordance with other embodiments of the present disclosure. A gusset 52 extends from the stop 38 to the top surface 24 on a side opposite the back end 44 of the slide rails 34 for strengthening purposes. The top surface 24 also includes a pair of ridges 60 that extend from the stop 38 towards the handle 28 also for strengthening purposes. The stop 38 may be disposed at or near the middle of the top surface 24 along its longitudinal axis. In the illustrated embodiment, the stop 38 is disposed slightly nearer the handle 28 end of the base 14 than the other end of the base 14. The stop 38 may have any other construction and configuration in accordance with other embodiments of the present disclosure. The base 14 may have any other structure and configuration in accordance with other embodiments of the present disclosure.

The bottom surface 26 of the base 14 may include an adhesive for securing the securing surface selectively to a wall of the container. The adhesive may be in any suitable form. The adhesive may, for example, be in the form of an acrylic based or rubber based adhesive. A removable release liner may also be included. After removal of the release liner, the cargo restraint device base 14 can be pressed against one of the walls of the container. The adhesive may be instead disposed directly on the rear surface, may be in the form of a two-sided tape with a removable release liner, or may be in any other suitable form.

Figure 7:
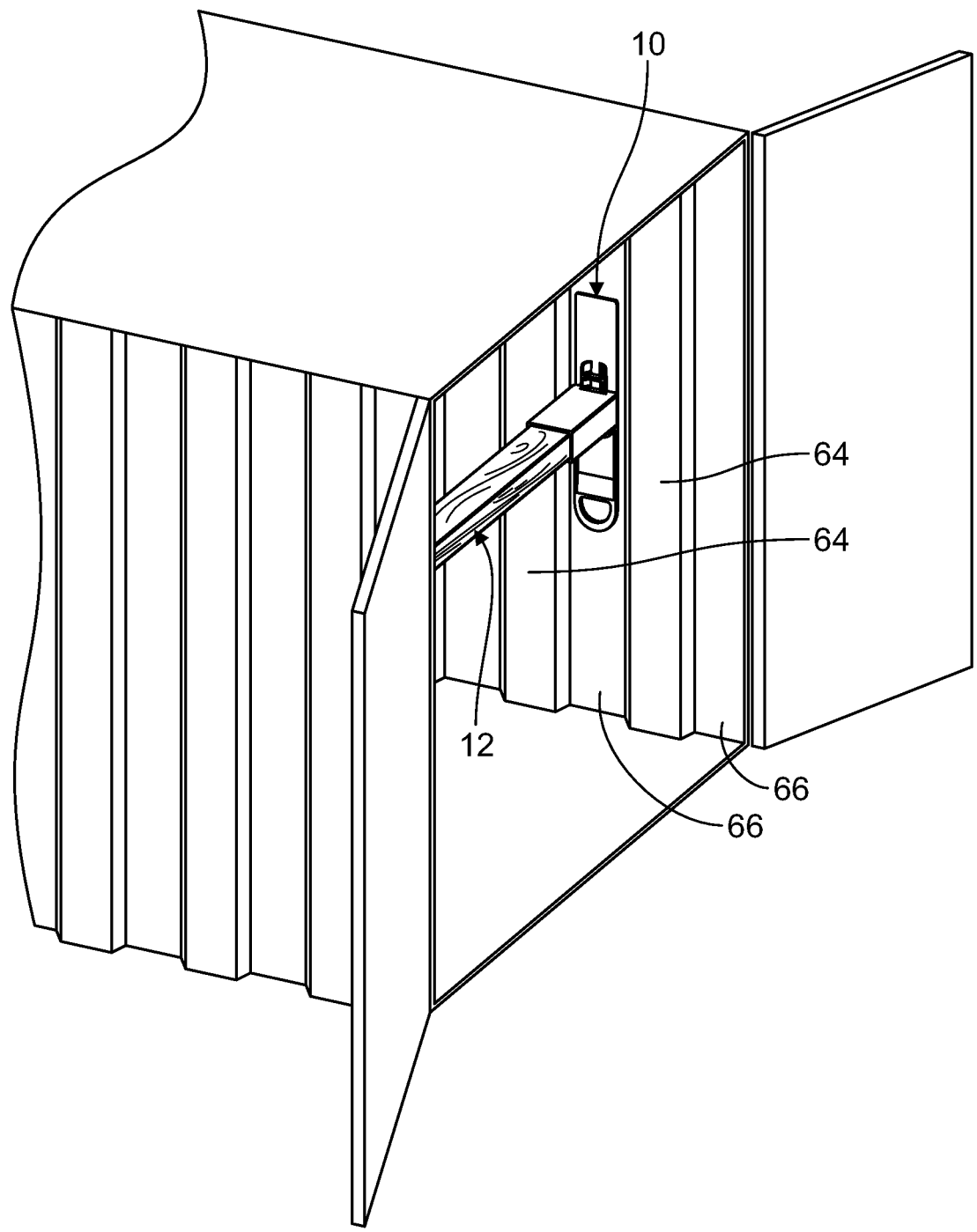
FIG. 7 is a top view of a corrugated wall of a shipping container and the cargo restraint assemblies and elongate support of FIG. 1 for restraining cargo in a shipping container in accordance with an illustrated embodiment of the present disclosure.

The base 14 may be secured to a flat wall of a container having flat walls (see, e.g., FIG. 7). The base 14 also may be secured to a corrugated wall of a container having corrugated walls (see, e.g., FIG. 8). If the shipping container has corrugated walls, the base 14 strip may be secured to either one of the peaks 64 or one of the troughs 66 of the corrugated wall. The corrugated walls may, for example, be the type associated with containers used by rail owned or associated carriers such as, for example, Norfolk Southern, Union Pacific, CSX, BNSF, CN, or CP, or freight companies such as, for example, JB Hunt, Schneider National, Hub Group, XPO Logistics, Swift Transportation, Werner, Knight Transportation, C.H. Robinson or APL Logistics. The corrugations may have any other suitable configurations. The illustrated sleeve 16 defines a cavity 68 and a top opening 70 leading to the cavity 68, which are sized and configured to receive a wood 2×3. The sleeve 16 instead may be sized and configured to a wood 2×4 or 4×4 or any other elongate support. The sleeve 16 includes two opposed walls 72, two opposed walls 74 and a floor 76. Each of the opposed walls 72 defines a pair of openings 80 for engaging the stabilizers 50 and thus each wall 72 can selectively be a front wall or a back wall to further simplify installation. The openings 80 and the stabilizers 50 are configured to facilitate receipt of the stabilizers by the openings. Although only one of the walls 72 is engaged with the stabilizers 50, each wall 72 includes the pair of openings 80 so that the installer can selectively engage either wall 72 to the stabilizers 50 without having to identify a rear wall. The floor 76 includes a plurality of ribs 82 and defines a hole 84. The bottom of the sleeve includes a plurality of strengthening ribs (not shown).

The illustrated sleeve 16 includes a bottom 90 with engaging structure for engaging the engaging structure of the base, including two feet portions 94 that define a dovetail slot 96 for slidingly receiving the slide rails 34. During engagement of the base 14 and sleeve 16, the feet portions 94 straddle the sliding rails 34 of the base and engage the top surface 24 of the base 14. The dovetail slot 96 extends from one of the walls 72 to the other wall 72. The dovetail slot 96 may be in any other suitable configuration depending upon the structure and number of the slide rails 34 on the top surface 24 of the base 14. The bottom 26 of the feet portions 94 may include a plurality of ribs. The sleeve 16 may have any other structure and configuration in accordance with other embodiments of the present disclosure.

The foam inserts 18 are used to provide a snug fit between the elongate support 12 and the sleeves 16 to secure the elongate support within the cargo restraint assemblies 10. The foam inserts 18 also allow the cargo restraint assemblies 10 to be used with elongate supports 12 that are not standard sizes or in containers that are not standard sizes. For example, the foam inserts 18 can be used with 8' beams and also with beams slightly longer, or slightly shorter, and can be used with containers having standard widths but also can accommodate containers having slightly different widths. The foam insert 18 may have one or more perforations for removing portions of the foam during installation to reduce the size of the foam insert received by the sleeve 16. The foam inserts 18 may have any suitable size and shape in accordance with other embodiments of the present disclosure.

The cargo restraint assemblies 10 may be installed as described as follows or in any other suitable manner. The base 14 of one of the cargo restraint assemblies 10 is secured by the adhesive to one of the walls of the container such that its longitudinal axis is vertical and such that the slide rails 34 extend vertically upward from the back end 44 to the front end 42. The foam insert 18 is received by the cavity 68 of the sleeve 16. The sleeve 16 is engaged with the slide rails 34 by aligning the slide rails 34 and the slot 96 at the front end 42 of the slide rails 34 and sliding the sleeve 16 from the front end 42 of the slide rails 34 to the back of the slide rails 34 such that the sleeve 16 engages the stop 38 and the stabilizers 50 of one of the walls 72 are received by the openings 80 of one of the walls 72. The elongate support 12 is inserted into the cavity 68 of the sleeve 16 at that time or prior to engagement of the sleeve 16 and base 14. The stop 38 prevents the sleeve 16 from moving vertically downward and thus limits the movement of the sleeve 16 relevant to the base 14 in a longitudinally downward direction.

This process is repeated on the opposed wall of the container with a second cargo restraint assembly 10 except that the other end of the elongate support 12 will likely need to be inserted into the cavity 68 prior to engagement of the base 14 and the sleeve 16. As the sleeve 16 is engaged with the base 14, pressure is exerted on the foam inserts 18 or other resilient material in the sleeves 16. Once the elongate support 12 is secured to the pair of cargo restraint assemblies 10, it will restrain cargo.

The cargo restraint assemblies 10 can be secured to flat walls or corrugated walls as indicated above. The base 14 may also be sized, for example, such that the cargo restraint assemblies 10 can be secured to either a peak 64 or trough 66 of the corrugated walls. The walls of the container may be the inner walls of the container or any other structure in or associated with the container.

After use, the cargo restraint assemblies 10 can be removed in any suitable manner and without tools such as hammers or sharp objects. For example, during removal of either or both of the cargo restraint assemblies 10, the elongate support 12 can remain in the cavity 68 of the sleeve 16 and each cargo restraint assembly 10 can be easily removed from the walls of the container by applying leverage to the elongate support 12 such that the base 14 disengages from the wall of the container. The slide rails 34 and ribs 36 may be designed with sufficiently rigidity to maintain the engagement of the sleeve 16 and base 14 during the application of the leverage.

Alternatively, the elongate support 12 can be disengaged from the cargo restraint assemblies 10 by sliding one or both of the sleeves 16 upward relative to the stop 38 until the elongate support can be removed. The bases 14 can then be separated from the wall of the container in any suitable manner.

The base 14 can be used with different sleeves 16 to accommodate different size elongate supports 12. For example, sleeves 16 can be selected depending upon the size of the elongate support, e.g., 2×3 or 2×4. The cargo restraint assembly 10 in accordance with the present disclosure provides ease of assembly and ease of removal. It also can be used on flat container walls or corrugated container walls.

Figure 8:
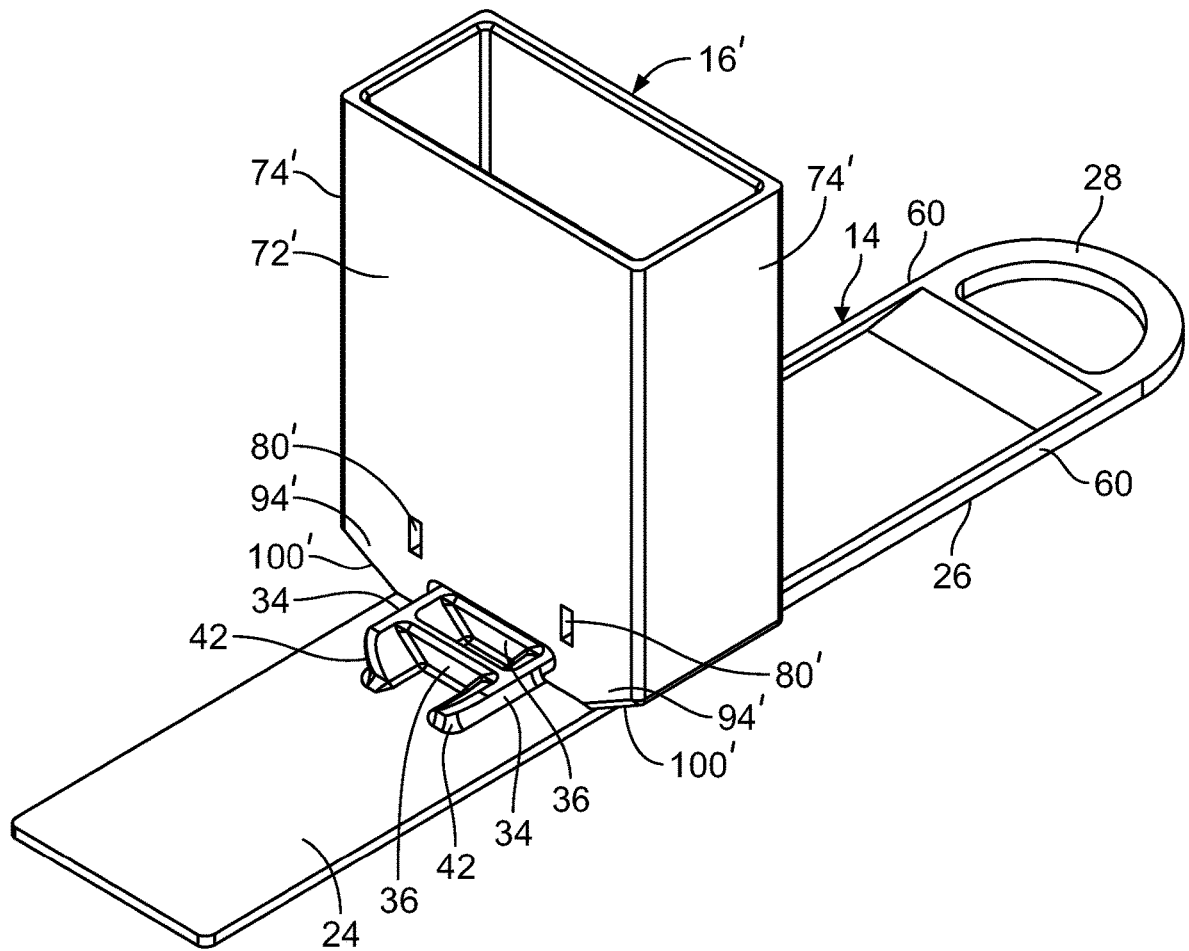
FIG. 8 is a perspective view of a cargo restraint assembly in accordance with another embodiment of the present disclosure.

FIG. 8 illustrates a sleeve 16' that is sized to receive a wider elongate support, such as a 2×4, and has a width that is greater than the width of the base 14. The illustrated sleeve 16' is constructed substantially identical to the sleeve 16 except that each of the feet 94' includes walls 100 and the walls 74' do not extend the full height of the sleeve 16'. Such structure defines clearances or other voids at the base of the feet 94' for accommodating corrugated walls. The sleeve 16' can also be used with flat walls. The sleeve 16' is slidably engageable with the base 14 as set forth above in connection with the sleeve 16.

Figure 9:
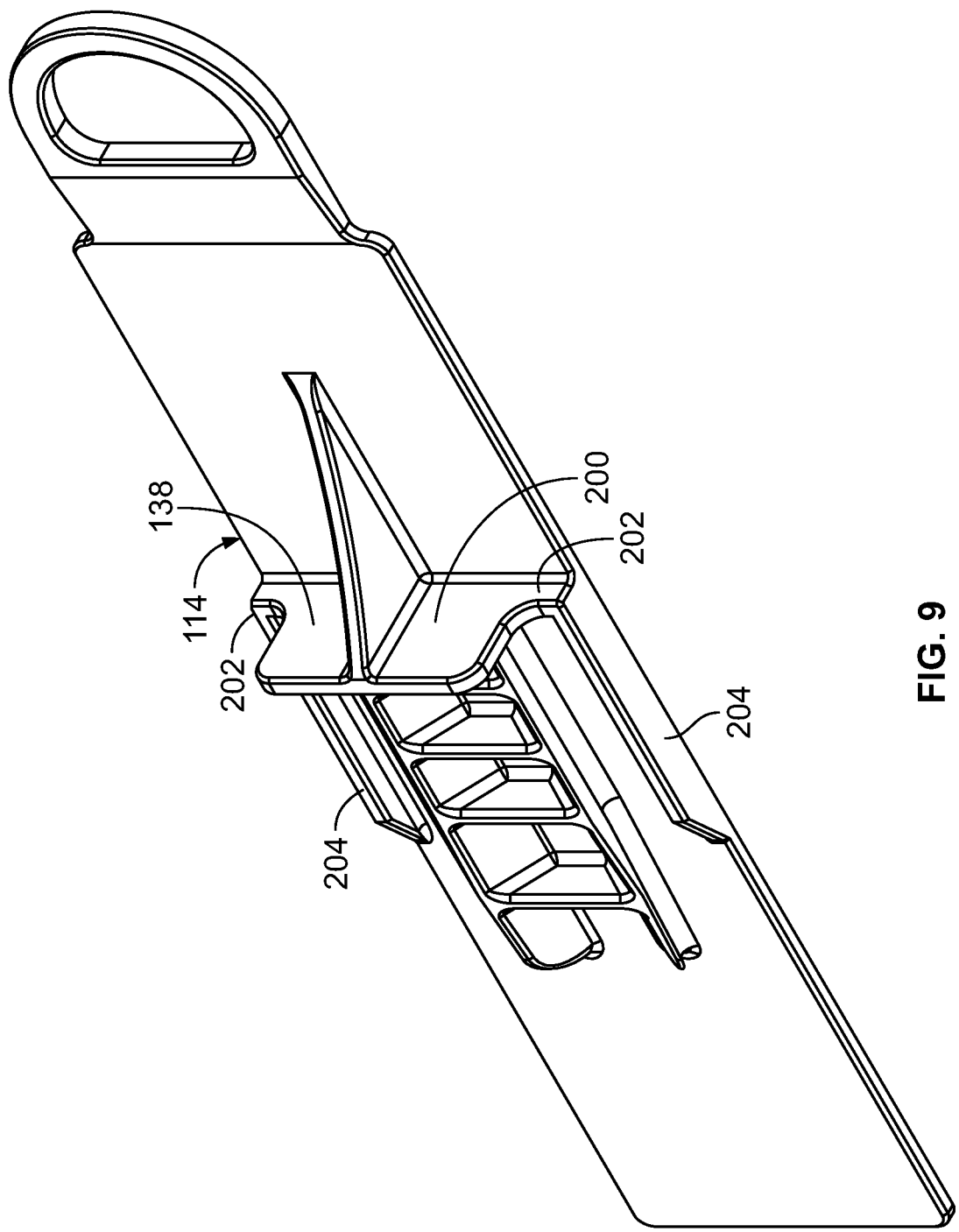
FIG. 9 is a perspective view of a base of a cargo restraint assembly in accordance with another embodiment of the present disclosure.
Figure 10:
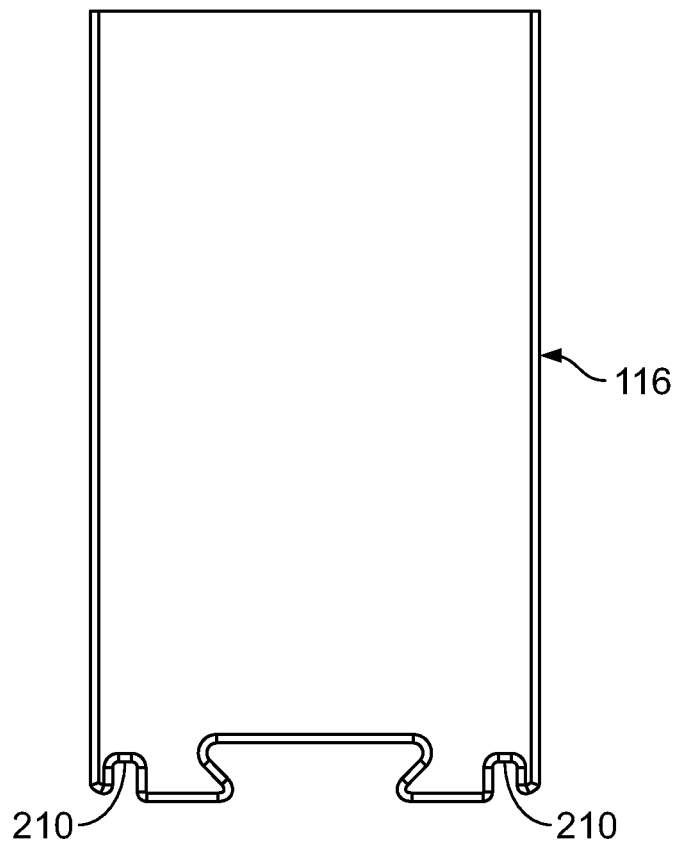
FIG. 10 is a side plan view of a sleeve of the cargo restraint assembly of FIG. 9.
Figure 11:
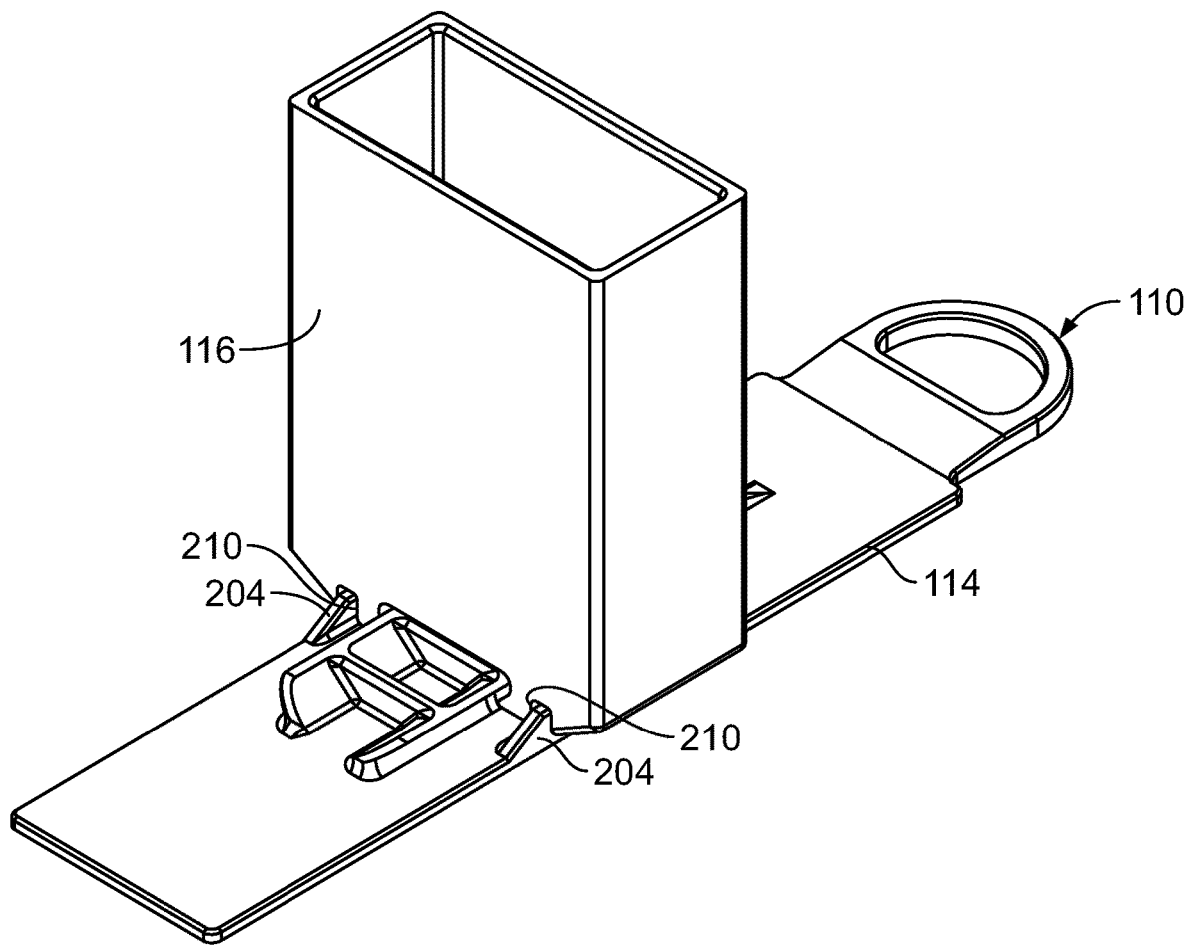
FIG. 11 is a perspective of the cargo restraint assembly of FIGS. 9 and 10.
Figure 12:
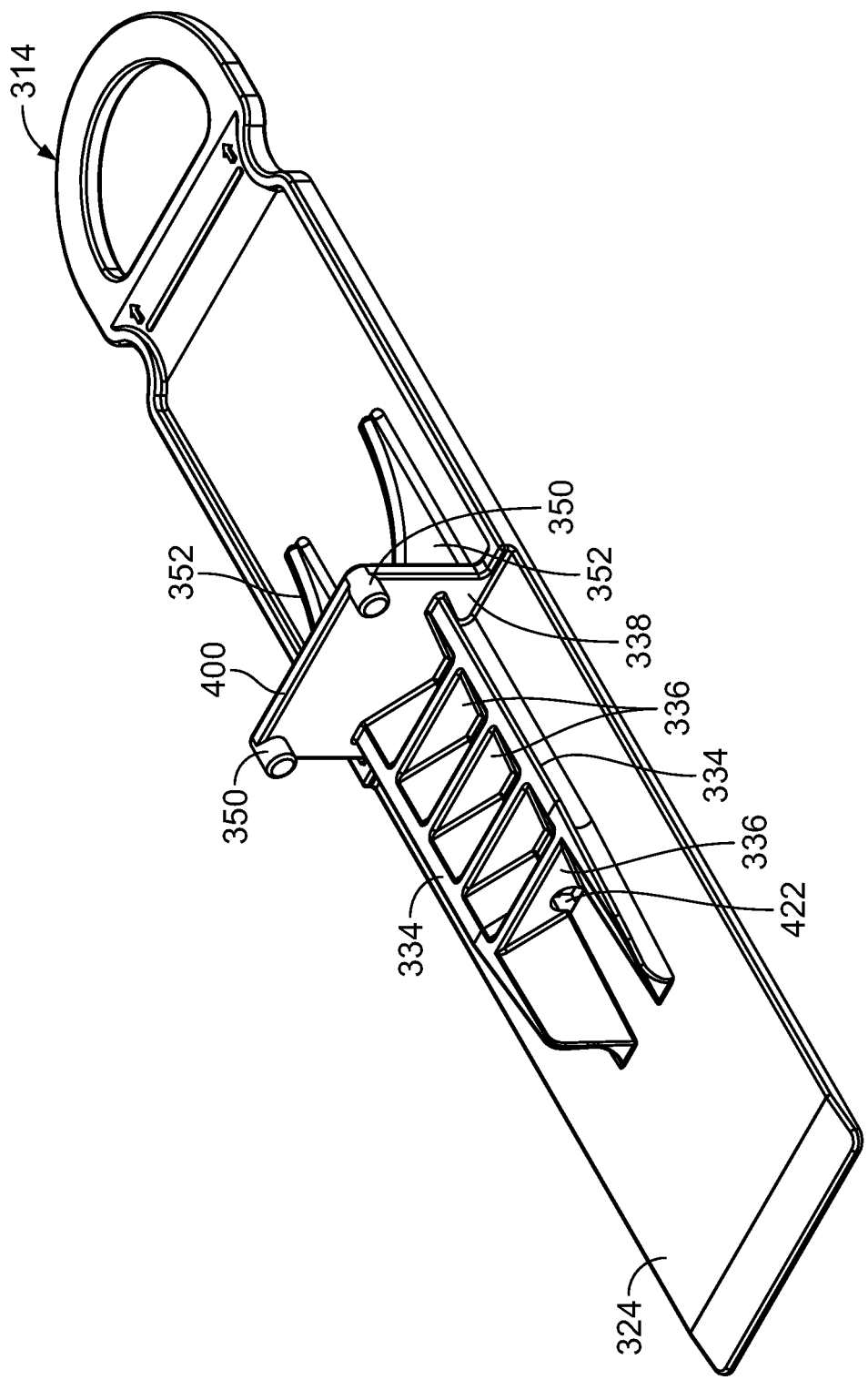
FIG. 12 is a perspective view of a base of a cargo restraint assembly in accordance with another embodiment of the present disclosure.
Figure 13:
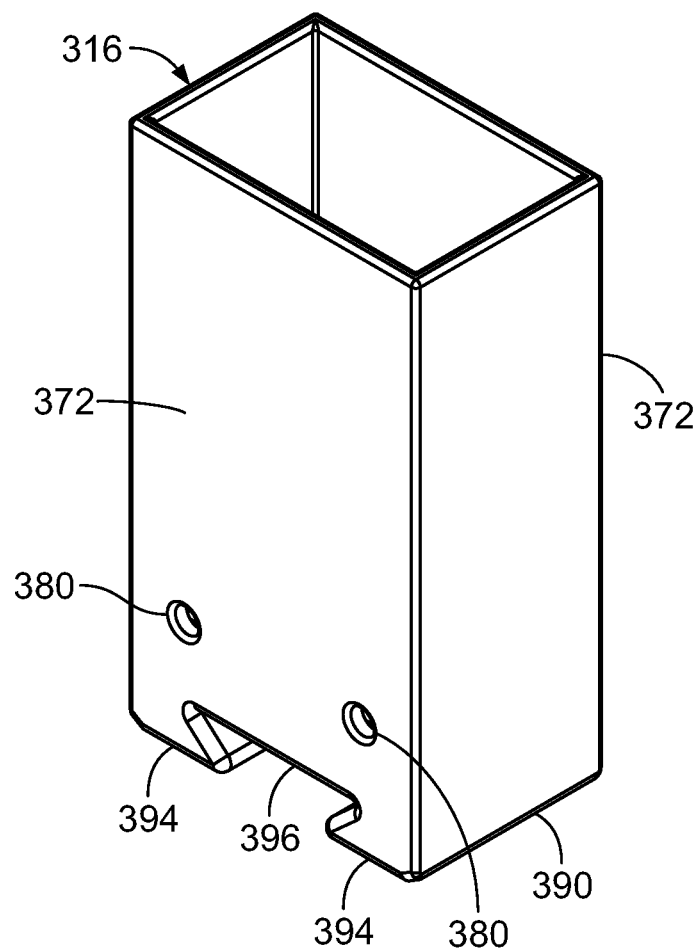
FIG. 13 is a side view of a sleeve of the cargo restraint assembly engageable with the base of FIG. 12.
Figure 14:
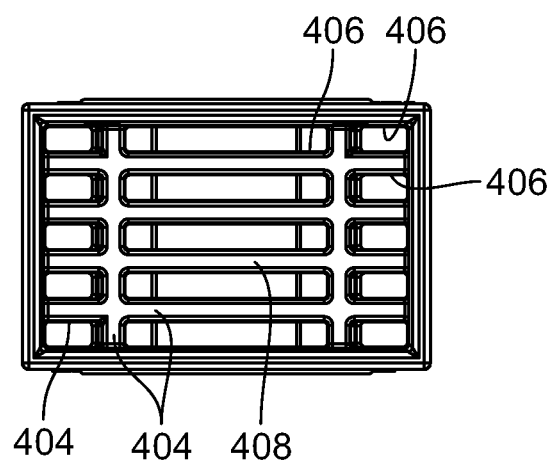
FIG. 14 is a top view of the sleeve of FIG. 13.
Figure 15:
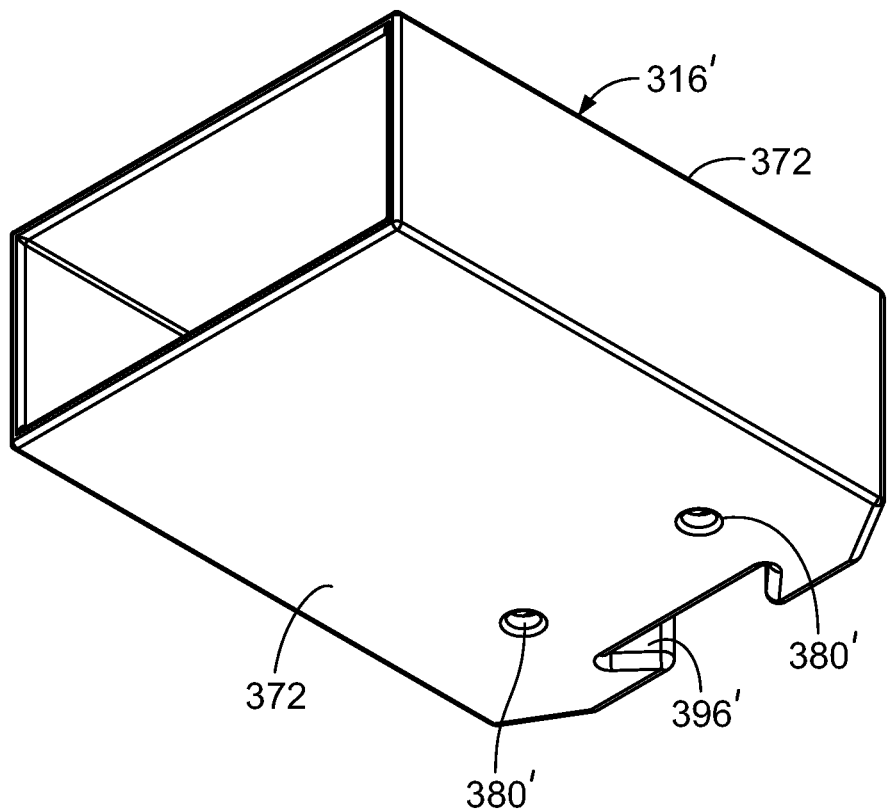
FIG. 15 is a perspective view of another sleeve of the cargo restraint assembly engageable with the base of FIG. 12.
Figure 16:
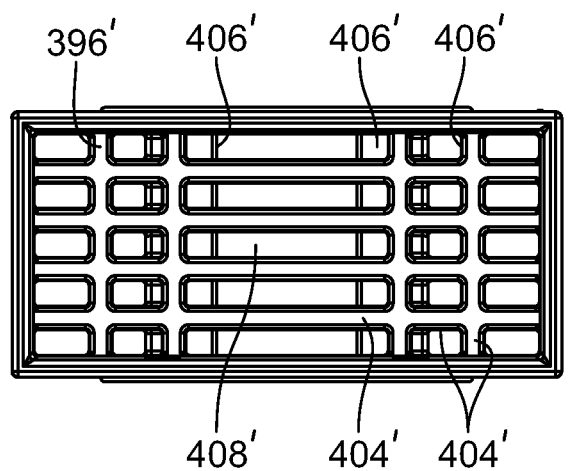
FIG. 16 is a top view of the sleeve of FIG. 15.

FIGS. 9-11 illustrate a base 114 and sleeve 116 of a cargo restraint assembly 110 in accordance with another embodiment of the present disclosure. The base 114 includes a stop 138 that includes a center wall 200 and a pair of side walls 202 disposed about the center wall. The center wall 200 extends higher than the side walls 202. The corners of the center wall 200 may be rounded. A pair of lips 204 extends from the side walls 202 for engaging the base of the cargo restraint assembly. The sleeve 116 includes a pair of channels 210 for slidably engaging the lips 204. The stabilizers 50 of FIGS. 1-8 may be eliminated in this and other embodiments. The bottom of the sleeve may include a plurality of strengthening ribs. Similar to the embodiment of FIG. 8, if the sleeve 116 is sized to receive a wider elongate support, such as a 2×4, having a width that is greater than the width of the base 114, the sleeve may include feet that define clearances or other voids at the base of the feet for accommodating corrugated walls. The feet also may define the channels for slidably engaging the lips 204.

FIGS. 12-16 illustrate a base 314 and a sleeve 316 of a cargo restraint assembly in accordance with another embodiment of the present disclosure. The base 314 includes a stop 338 that includes a center wall 400 and a pair of stabilizers 350 in the form of pegs. The center wall 400 has a width less than the width of the base 314. The corners of the center wall 400 may be rounded.

The top surface 324 of base 314 includes engaging structure for engaging the sleeve 316, including a pair of spaced slide rails 334 extending along a longitudinal axis of the top surface 324. A plurality of strengthening ribs 336 may interconnect the pair of spaced slide rails 334. A pair of gussets 352 extends from the stop 338 to the top surface 324 on a side opposite the slide rails 334 for strengthening purposes.

The illustrated sleeve 316 includes a bottom 390 with engaging structure for engaging the engaging structure of the base, including two feet portions 394 that define a dovetail slot 396 for slidingly receiving the slide rails 334. During engagement of the base 314 and sleeve 316, the feet portions 394 straddle the sliding rails 334 of the base and engage the top surface 324 of the base 314. The dovetail slot 396 may be in any other suitable configuration depending upon the structure and number of the slide rails 334 on the top surface 324 of the base 314 or the configuration of the engaging structure of the base.

The sleeve 316 may define a pair of openings 380 on at least one of the walls 372 of the sleeve for engaging the stabilizers 350. Each wall 372 can selectively be a front wall or a back wall to further simplify installation if the openings 380 are defined in both walls 372. The bottom 390 of the sleeve 316 defines a dovetail slot 396. The bottom 390 may include a plurality of struts 404 defining a plurality of openings 406 to form a grate 408 to reduce manufacturing costs and weight. Sleeve 316 may be sized and configured to receive a wood 2×3.

Similar to above embodiments, an alternative sleeve 316' is sized to receive a wider elongate support, such as a 2×4, and has a width that is greater than the width of the base 314. The sleeve 316' may include feet 394' that define clearances or other voids at the base of the feet for accommodating corrugated walls.

The bottom 390' of the sleeve 316' may include a plurality of struts 404' defining a plurality of openings 406' to form a grate 408' to reduce manufacturing costs and weight. The sleeve 316' may be sized and configured to receive elongated supports of any other size, and may have any other structure and configuration in accordance with other embodiments of the present disclosure.

Figure 17:
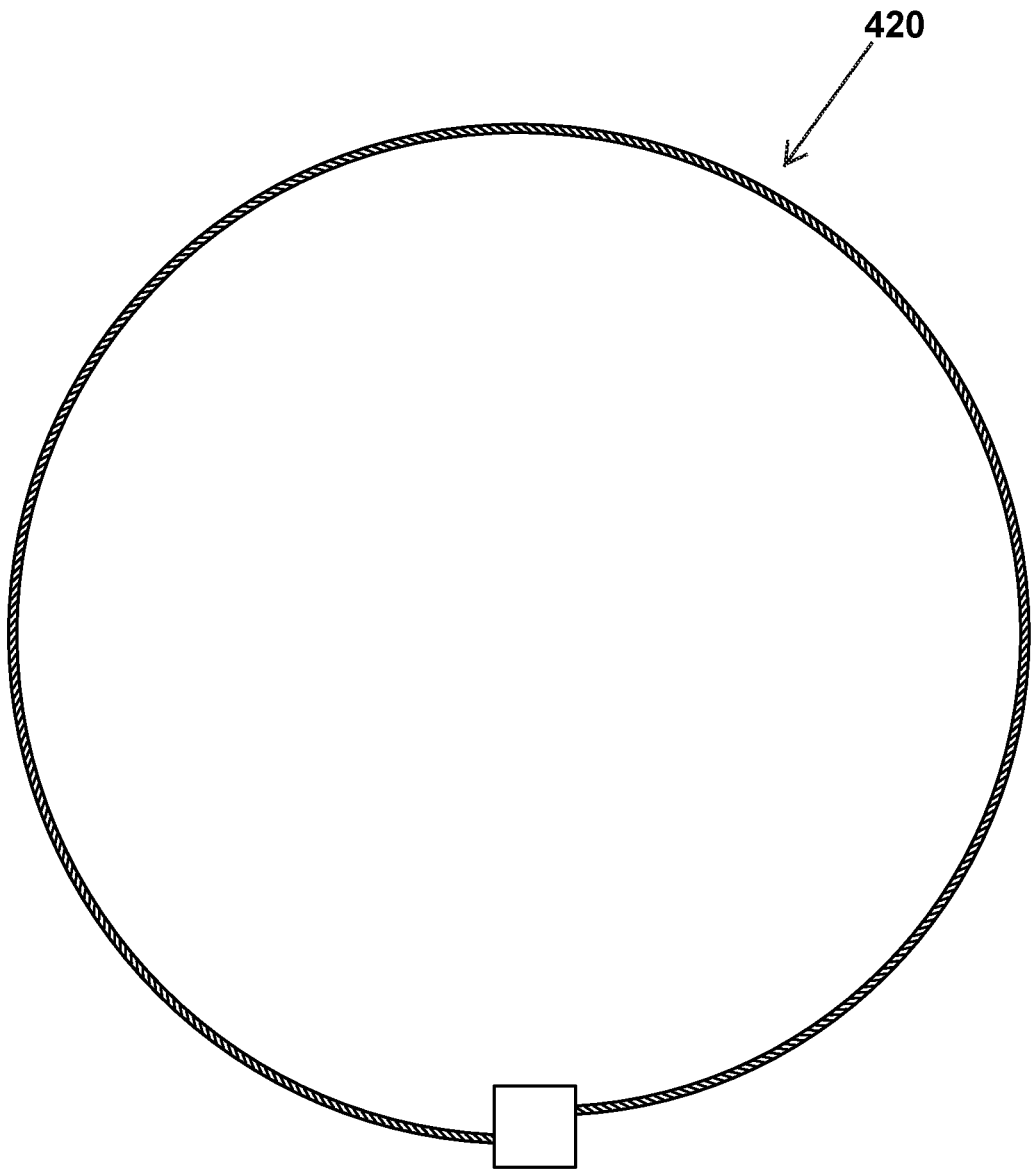
FIG. 17 is a side view of a tamper resistant cord that may be included with the cargo restraint assembly of FIGS. 12-16.

The cargo restraint assembly illustrated in FIGS. 12-16 include tamper evident structure for evidencing any tampering of the assembly during transport. For example, the illustrated base 314 includes a cable seal 420 (see FIG. 17) that is received by a hole 422 defined by one of the ribs 336. The cable seal 420 may extend around or otherwise engage the sleeve 316 to detect tampering during use of the cargo restraint assembly. The cargo restraint assembly of FIGS. 12-16 may also include a foam insert as described above in connection with other embodiments.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There is a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A method for engaging an elongate support for restraining cargo in a container having a pair of spaced walls, the method comprising:
securing to one of the walls a base strip such that a longitudinal axis of the base strip extends in a vertical direction, the base strip including a top surface having first engaging structure extending along the longitudinal axis; and
engaging the base strip and a sleeve defining a cavity for receiving an end of the elongate support and having second engaging structure by engaging the first engaging structure and the second engaging structure;
wherein the base strip comprises a slide rail extending along the longitudinal axis and the first engaging structure includes the slide rail and the second engaging structure defines a slot on the sleeve for receiving the slide rail;
wherein engaging the base strip and a sleeve includes sliding the slide rail into the slot; and
limiting the movement of the sleeve in a longitudinal direction of the longitudinal axis after slidably engaging the base strip and the sleeve with a stop disposed on the top surface of the base strip extending substantially the entire width of the base strip adjacent an end of the rail and wherein the securing includes positioning the base strip such that the slide rail extends from the stop vertically upwards along the wall.

2. The method of claim 1 wherein the base strip comprises another slide rail and the first engaging structure includes the other slide rail and wherein slidably engaging the base strip and the sleeve includes sliding the slide rails into the slot.

3. The method of claim 1 further including limiting the movement of the sleeve in a longitudinal direction along the longitudinal axis after engaging the base strip and the sleeve.

4. The method of claim 1 further including engaging the base strip and the sleeve by slidingly receiving a pair of lips of the base strip within a pair of channels defined by the sleeve.

5. The method of claim 1 wherein the wall is corrugated and securing includes securing the base strip selectively to one of a trough of the corrugated wall or a peak of the corrugated wall.

6. The method of claim 1 wherein the sleeve includes a bottom defining a plurality of openings.

7. The method of claim 1 wherein slidably engaging the base strip and the sleeve includes sliding another slide rail of the top surface into the slot defined by the sleeve.

8. The method of claim 1 further including limiting the movement of the sleeve in a longitudinal direction of the longitudinal axis after slidably engaging the base strip and the sleeve.

9. The method of claim 1 further including limiting the movement of the sleeve in a longitudinal direction of the longitudinal axis after slidably engaging the base strip and the sleeve with a stop disposed on the top surface of the base strip.

10. The method of claim 1 wherein the base strip includes a stop and the securing includes positioning the base strip such that the slide rails extend from the stop vertically upwards along the wall.

11. The method of claim 10 further including limiting the movement of the sleeve in a longitudinal direction of the longitudinal axis after slidably engaging the base strip and the sleeve.

12. A method for engaging an elongate support for restraining cargo in a container having a pair of spaced walls, the method comprising:
securing to one of the walls a base strip such that a longitudinal axis of the base strip extends in a vertical direction, the base strip including a top surface having first engaging structure extending along the longitudinal axis; and
engaging the base strip and a sleeve defining a cavity for receiving an end of the elongate support and having second engaging structure by engaging the first engaging structure and the second engaging structure;
wherein the first engaging structure includes a pair of slide rails and the second engaging structure defines a slot for receiving the slide rails and wherein slidably engaging the base strip and the sleeve includes sliding the slide rails into the slot; and
wherein a leading end of each of the slide rails is tapered, a leading end of the second slide rail is tapered and the slot is a dovetail slot and wherein slidably engaging the base strip and the sleeve includes sliding the tapered ends into the slot.

13. The method of claim 12 further including limiting the movement of the sleeve in a longitudinal direction of the longitudinal axis after slidably engaging the base strip and the sleeve with a stop disposed on the top surface of the base strip adjacent other ends of the two slide rails.

14. The method of claim 13 wherein the securing includes positioning the base strip such that the slide rails extend from the stop vertically upwards along the wall.

15. A method for engaging an elongate support for restraining cargo in a container having a pair of spaced walls, the method comprising:
securing to one of the walls a base strip such that a longitudinal axis of the base strip extends in a vertical direction, the base strip including a top surface having first engaging structure extending along the longitudinal axis;
engaging the base strip and a sleeve defining a cavity for receiving an end of the elongate support and having second engaging structure by engaging the first engaging structure and the second engaging structure;
limiting the movement of the sleeve in a longitudinal direction along the longitudinal axis after engaging the base strip and the sleeve with a stop disposed on the top surface of the base strip; and
including stabilizing the sleeve relative to the base strip by receiving a stabilizer disposed on the stop within an opening defined by the sleeve.

16. The method of claim 15 wherein the stabilizer comprises a peg.

17. A method for engaging an elongate support for restraining cargo in a container having a pair of spaced walls, the method comprising:
securing to one of the walls a base strip such that a longitudinal axis of the base strip extends in a vertical direction, the base strip including a top surface having first engaging structure extending along the longitudinal axis;
engaging the base strip and a sleeve defining a cavity for receiving an end of the elongate support and having second engaging structure by engaging the first engaging structure and the second engaging structure;

limiting the movement of the sleeve in a longitudinal direction along the longitudinal axis after engaging the base strip and the sleeve with a stop disposed on the top surface of the base strip; and including stabilizing the sleeve relative to the base strip by receiving a plurality of stabilizers disposed on the stop within a pair of openings defined by the sleeve.

18. The method of claim 17 wherein the stabilizers comprise pegs.

19. The method of claim 17 further including engaging the base strip and the sleeve by slidingly receiving a pair of lips of the base strip within a pair of channels defined by the sleeve.

\* \* \* \* \*